United States Patent
Yu et al.

(10) Patent No.: US 12,207,156 B2
(45) Date of Patent: Jan. 21, 2025

(54) SYSTEMS AND METHODS FOR PROVIDING GUIDANCE INSTRUCTIONS TO AN OPERATIONAL CHARGING UNIT

(71) Applicant: GM Global Technology Operations LLC, Detroit, MI (US)

(72) Inventors: Bo Yu, Troy, MI (US); Donald K. Grimm, Utica, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 494 days.

(21) Appl. No.: 17/683,464

(22) Filed: Mar. 1, 2022

(65) Prior Publication Data
US 2023/0283986 A1    Sep. 7, 2023

(51) Int. Cl.
| | |
|---|---|
| H04W 4/02 | (2018.01) |
| B60L 53/66 | (2019.01) |
| G06N 7/01 | (2023.01) |
| G06V 20/58 | (2022.01) |
| G06V 40/10 | (2022.01) |
| H04W 4/024 | (2018.01) |
| H04W 4/44 | (2018.01) |

(52) U.S. Cl.
CPC ............ *H04W 4/024* (2018.02); *B60L 53/66* (2019.02); *G06N 7/01* (2023.01); *G06V 20/58* (2022.01); *G06V 40/10* (2022.01); *H04W 4/027* (2013.01); *H04W 4/44* (2018.02); *B60L 2240/627* (2013.01); *B60L 2240/72* (2013.01)

(58) Field of Classification Search
CPC .......... B60L 2240/12; B60L 2240/622; B60L 2240/627; B60L 2240/72; B60L 2260/32; B60L 53/36; B60L 53/65; B60L 53/66; G06N 20/00; G06N 7/01; G06V 20/58; G06V 40/10; G06V 40/103; H04W 4/024; H04W 4/025; H04W 4/027; H04W 4/44; Y02T 10/70; Y02T 10/7072; Y02T 90/12
See application file for complete search history.

(56) References Cited

U.S. PATENT DOCUMENTS

2019/0204840 A1* 7/2019 Park ................... G01C 21/3667

* cited by examiner

*Primary Examiner* — Nader Bolourchi
(74) *Attorney, Agent, or Firm* — Vivacqua Crane, PLLC (57) ABSTRACT

A charging unit guidance system includes a processor and a memory. The memory includes instructions that upon execution by the processor, cause the processor to receive a sequence of user states associated with a user of a first autonomous vehicle, each user state being one of a walking state and an at-charging-unit state and the sequence of user states being based on a sequence of observed user speeds associated with detected user position data associated with movement of the user from the first autonomous vehicle to a charging unit and at the charging unit, determine a charging unit location of the charging unit based on a correlation between the at-charging-unit states in the sequence of user states and the user position data, and upload the charging unit location associated with the charging unit to an edge computing system, the edge computing system being configured to provide guidance instructions to the charging unit to a second autonomous vehicle based at least in part on the charging unit location.

18 Claims, 7 Drawing Sheets

FIG. 10

SYSTEMS AND METHODS FOR PROVIDING GUIDANCE INSTRUCTIONS TO AN OPERATIONAL CHARGING UNIT

INTRODUCTION

The technical field generally relates to autonomous vehicles, and more particularly relates to systems and methods for providing guidance instructions to an operational charging unit.

Charging stations for electrical vehicles often include multiple parking spots. An example of an electric vehicle is an autonomous vehicle. A vehicle that parks in one of the parking spots at a charging station may have access to multiple charging units.

One or more of the charging units at a charging station may not be operational. Different charging units at the charging station may have different charging rates. A low charging rate may be indicative of operational issues associated with a charging unit. A user may not be aware that a charging unit is experiencing operational issues until the user tries to charge an autonomous vehicle using that charging unit. A user may attempt to use multiple charging units at a charging station prior to finding an operational charging unit. In some instances, a user may travel to multiple charging station prior to finding an operational charging unit.

SUMMARY

In an embodiment, a charging unit guidance system includes a processor and a memory. The memory includes instructions that upon execution by the processor, cause the processor to receive a sequence of user states associated with a user of a first autonomous vehicle, each user state being one of a walking state and an at-charging-unit state and the sequence of user states being based on a sequence of observed user speeds associated with detected user position data associated with movement of the user from the first autonomous vehicle to a charging unit and at the charging unit, determine a charging unit location of the charging unit based on a correlation between the at-charging-unit states in the sequence of user states and the user position data, and upload the charging unit location associated with the charging unit to an edge computing system, the edge computing system being configured to provide guidance instructions to the charging unit to a second autonomous vehicle based at least in part on the charging unit location.

In an embodiment, the detected user position data is detected by at least one of a surround view camera system and a wireless positioning sensor system of a vehicle sensor system of the first autonomous vehicle.

In an embodiment, the memory includes further instructions that upon execution by the processor, cause the processor to determine a parking spot location associated with the charging unit based in part on vehicle location data received from a vehicle sensor system of the first autonomous vehicle.

In an embodiment, the memory includes further instructions that upon execution by the processor, cause the processor to generate the sequence of user states associated with the sequence of observed user speeds using a Viterbi algorithm in conjunction with a user state Hidden Markov Model, the user states being hidden states.

In an embodiment, the memory includes further instructions that upon execution by the processor, cause the processor to generate at least two intermediate charging unit locations based on the user position data that correspond to at least two at-charging-unit states in the sequence of user states and determine the charging unit location of the charging unit based on an average of the at least two intermediate charging unit locations.

In an embodiment, the memory includes further instructions that upon execution by the processor, cause the processor to: receive a sequence of charging unit states associated with the charging unit, each of the charging unit states being one of an in-service state and an out-of-service state and the sequence of charging unit states being based on a sequence of observed charging rates associated with the charging unit; and determine a charging unit status of the charging unit based on the sequence of charging unit states.

In an embodiment, the memory includes further instructions that upon execution by the processor, cause the processor to upload the charging unit status associated with the charging unit to the edge computing system, the edge computing system being configured to provide guidance instructions to the charging unit to the second autonomous vehicle based in part on the charging unit status.

In an embodiment, the memory includes further instructions that upon execution by the processor, cause the processor to generate the sequence of the charging unit states associated with the sequence of the observed charging rates using a Viterbi algorithm in conjunction with a charging unit state Hidden Markov Model, the charging unit states being hidden states.

In an embodiment, a computer readable medium includes instructions stored thereon for providing guidance instructions to a charging unit, that upon execution by a processor, cause the processor to: receive a sequence of user states associated with a user of a first autonomous vehicle, each user state being one of a walking state and an at-charging-unit state and the sequence of user states being based on a sequence of observed user speeds associated with detected user position data associated with movement of the user from the first autonomous vehicle to a charging unit and at the charging unit; determine a charging unit location of the charging unit based on a correlation between the at-charging-unit states in the sequence of user states and the user position data; and upload the charging unit location associated with the charging unit to an edge computing system, the edge computing system being configured to provide guidance instructions to the charging unit to a second autonomous vehicle based at least in part on the charging unit location.

In an embodiment, the computer readable medium further includes instructions to cause the processor to receive the detected user position data from at least one of a surround view camera system and a wireless positioning sensor system of a vehicle sensor system of the first autonomous vehicle.

In an embodiment, the computer readable medium further includes instructions to cause the processor to determine a parking spot location associated with the charging unit based in part on vehicle location data received from a vehicle sensor system of the first autonomous vehicle.

In an embodiment, the computer readable medium further includes instructions to cause the processor to generate the sequence of user states associated with the sequence of observed user speeds using a Viterbi algorithm in conjunction with a user state Hidden Markov Model, the user states being hidden states.

In an embodiment, the computer readable medium further includes instructions to cause the processor to: generate at least two intermediate charging unit locations based on the user position data that correspond to at least two at-charging-unit states in the sequence of user states; and determine the charging unit location of the charging unit based on an average of the at least two intermediate charging unit locations.

In an embodiment, the computer readable medium further includes instructions to cause the processor to: receive a sequence of charging unit states associated with the charging unit, each of the charging unit states being one of an in-service state and an out-of-service state and the sequence of charging unit states being based on a sequence of observed charging rates associated with the charging unit; and determine a charging unit status of the charging unit based on the sequence of charging unit states.

In an embodiment, the computer readable medium further includes instructions to cause the processor to upload the charging unit status associated with the charging unit to the edge computing system, the edge computing system being configured to provide guidance instructions to the charging unit to the second autonomous vehicle based in part on the charging unit status.

In an embodiment, the computer readable medium further includes instructions to cause the processor to generate the sequence of the charging unit states associated with the sequence of the observed charging rates using a Viterbi algorithm in conjunction with a charging unit state Hidden Markov Model, the charging unit states being hidden states.

In an embodiment, a method of providing guidance instructions to a charging unit includes receiving a sequence of user states associated with a user of a first autonomous vehicle at a charging unit guidance system, each user state being one of a walking state and an at-charging-unit state and the sequence of user states being based on a sequence of observed user speeds associated with detected user position data associated with movement of the user from the first autonomous vehicle to a charging unit and at the charging unit; determining a charging unit location of the charging unit based on a correlation between the at-charging-unit states in the sequence of user states and the user position data at the charging unit guidance system; and uploading the charging unit location associated with the charging unit from the charging unit guidance system to an edge computing system, the edge computing system being configured to provide guidance instructions to the charging unit to a second autonomous vehicle based at least in part on the charging unit location.

In an embodiment, the method further includes generating the sequence of user states associated with the sequence of observed user speeds using a Viterbi algorithm in conjunction with a user state Hidden Markov Model, the user states being hidden states at the charging unit guidance system.

In an embodiment, the method further includes receiving a sequence of charging unit states associated with the charging unit at a charging unit guidance system, each of the charging unit states being one of an in-service state and an out-of-service state and the sequence of charging unit states being based on a sequence of observed charging rates associated with the charging unit; and determining a charging unit status of the charging unit based on the sequence of charging unit states at the charging unit guidance system.

In an embodiment, the method further includes uploading the charging unit status associated with the charging unit to the edge computing system, the edge computing system being configured to provide guidance instructions to the charging unit to the second autonomous vehicle based in part on the charging unit status.

BRIEF DESCRIPTION OF THE DRAWINGS

Exemplary embodiments will hereinafter be described in conjunction with the following drawing figures, wherein like numerals denote like elements.

DETAILED DESCRIPTION

The following detailed description is merely exemplary in nature and is not intended to limit the application and uses. Furthermore, there is no intention to be bound by any expressed or implied theory presented in the preceding introduction, summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
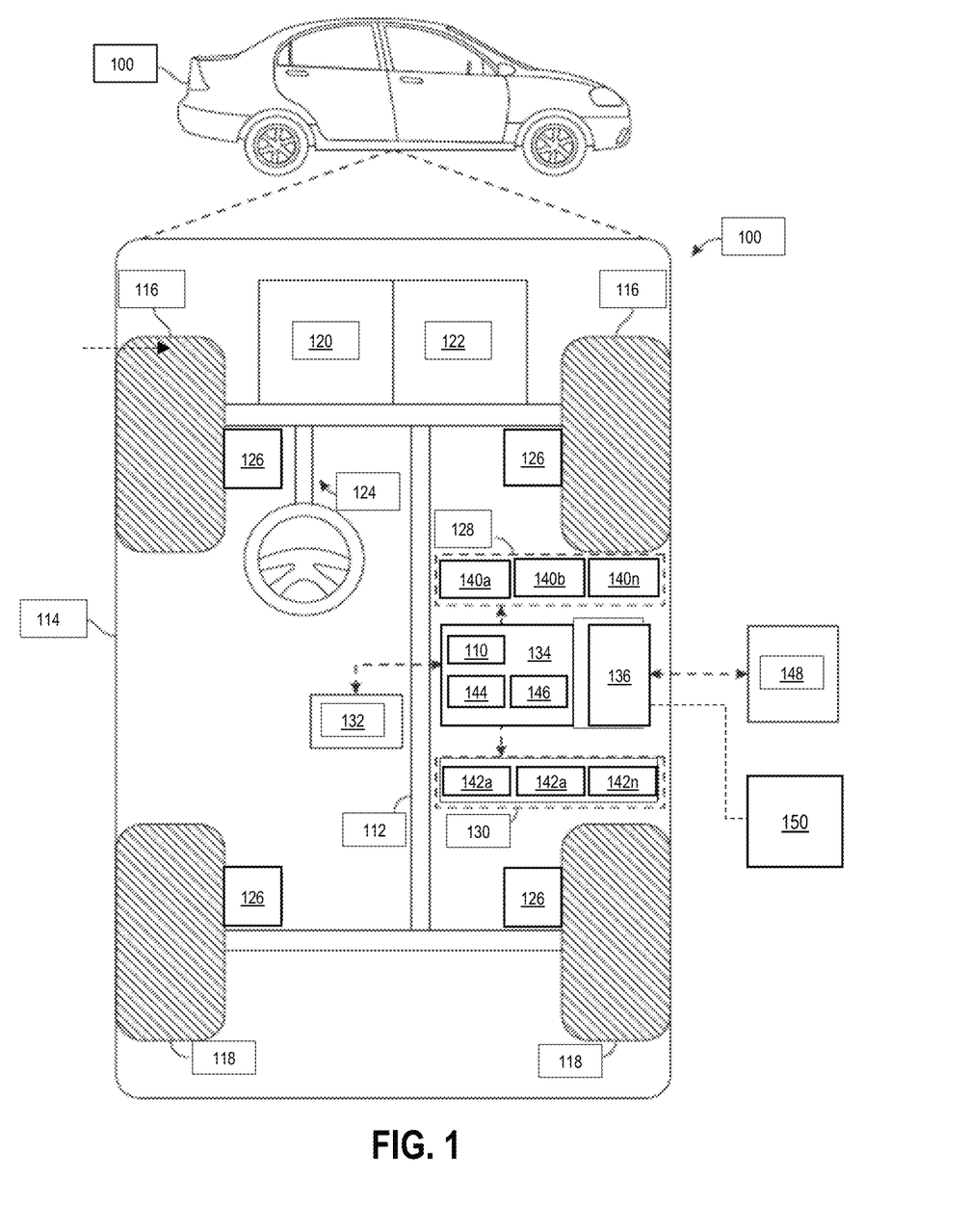
FIG. 1 is a functional block diagram representation of an autonomous vehicle including an embodiment of a charging unit guidance system.

Referring to FIG. 1, a functional block diagram representation of an autonomous vehicle 100 including an embodiment of a charging unit guidance system 110 is shown. The autonomous vehicle 100 generally includes a chassis 112, a body 114, front wheels 116, and rear wheels 118. The body 114 is arranged on the chassis 112 and substantially encloses components of the autonomous vehicle 100. The body 114 and the chassis 112 may jointly form a frame. The front wheels 116 and the rear wheels 118 are each rotationally coupled to the chassis 112 near a respective corner of the body 114.

The autonomous vehicle 100 is, for example, a vehicle that is automatically controlled to carry passengers from one location to another. While the autonomous vehicle 100 is depicted in the illustrated embodiment as a passenger car, other examples of autonomous vehicles include, but are not limited to, motorcycles, trucks, sport utility vehicles (SUVs), recreational vehicles (RVs), marine vessels, and aircraft. In an embodiment, the autonomous vehicle 100 is a so-called Level Four or Level Five automation system. A Level Four system indicates "high automation", referring to the driving mode-specific performance by an automated driving system (ADS) of all aspects of the dynamic driving task, even if a human driver does not respond appropriately to a request to intervene. A Level Five system indicates "full automation", referring to the full-time performance by an ADS of all aspects of the dynamic driving task under all roadway and environmental conditions that can be managed by a human driver.

As shown, the autonomous vehicle 100 generally includes a propulsion system 120, a transmission system 122, a steering system 124, a brake system 126, a vehicle sensor system 128, an actuator system 130, at least one data storage device 132, at least one controller 134, and a vehicle communication system 136. The propulsion system 120 may, in various embodiments, include an internal combustion engine, an electric machine such as a traction motor, and/or a fuel cell propulsion system. The transmission system 122 is configured to transmit power from the propulsion system 120 to the front wheels 116 and the rear wheels 118 according to selectable speed ratios. According to various embodiments, the transmission system 122 may include a step-ratio automatic transmission, a continuously-variable transmission, or other appropriate transmission. The brake system 126 is configured to provide braking torque to the front wheels 116 and the rear wheels 118. The brake system 126 may, in various embodiments, include friction brakes, brake by wire, a regenerative braking system such as an electric machine, and/or other appropriate braking systems. The steering system 124 influences a position of the front wheels 116 and the rear wheels 118. While depicted as including a steering wheel for illustrative purposes, in some embodiments contemplated within the scope of the present disclosure, the steering system 124 may not include a steering wheel.

The vehicle sensor system 128 includes one or more vehicle sensing devices 140a-140n that sense observable conditions of the exterior environment and/or the interior environment of the autonomous vehicle 100. Examples of vehicle sensing devices 140a-140n include, but are not limited to, radars, lidars, global positioning systems, optical cameras, thermal cameras, ultrasonic sensors, and/or other sensors. In an embodiment, the vehicle sensor system 128 includes a surround view camera system. In an embodiment, the vehicle sensor system 128 includes a wireless positioning sensor system. In an embodiment, the vehicle sensor system 128 includes a surround view camera system and a wireless positioning sensor system. The actuator system 130 includes one or more actuator devices 142a-142n that control one or more vehicle features such as for example, but not limited to, the propulsion system 120, the transmission system 122, the steering system 124, and the brake system 126. In various embodiments, the vehicle features can further include interior and/or exterior vehicle features such as for example, but are not limited to, doors, a trunk, and cabin features such as for example air, music, and lighting.

The vehicle communication system 136 is configured to wirelessly communicate information to and from other entities ("vehicle-to-everything (V2X)" communication). For example, the vehicle communication system 136 is configured to wireless communicate information to and from other vehicles 148 ("vehicle-to-vehicle (V2V)" communication), to and from driving system infrastructure ("vehicle to infrastructure (V2I)" communication), remote systems, to and from an edge computing system 150 and/or personal devices. In an embodiment, the vehicle communication system 136 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels designed for automotive use and a corresponding set of protocols and standards.

The data storage device 132 stores data for use in automatically controlling the autonomous vehicle 100. The data storage device 132 may be part of the controller 134, separate from the controller 134, or part of the controller 134 and part of a separate system.

The controller 134 includes at least one processor 144 and a computer readable storage device 146. The computer readable storage device 146 may also be referred to a computer readable media 146 and a computer readable medium 146. In an embodiment, the computer readable storage device 146 includes an embodiment of a charging unit guidance system 110. The processor 144 can be any custom made or commercially available processor, a central processing unit (CPU), a graphics processing unit (GPU), an auxiliary processor among several processors associated with the controller 134, a semiconductor-' based microprocessor (in the form of a microchip or chip set), a macroprocessor, any combination thereof, or generally any device for executing instructions. The computer readable storage device 146 may include volatile and nonvolatile storage in read-only memory (ROM), random-access memory (RAM), and keep-alive memory (KAM), for example. KAM is a persistent or non-volatile memory that may be used to store various operating variables while the processor 144 is powered down. The computer-readable storage device 146 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 134 in controlling the autonomous vehicle 100.

The instructions may include one or more separate programs, each of which comprises an ordered listing of executable instructions for implementing logical functions. The instructions, when executed by the processor 144, receive and process signals from the vehicle sensor system 128, perform logic, calculations, methods and/or algorithms for automatically controlling the components of the autonomous vehicle 100, and generate control signals to the actuator system 130 to automatically control one or more components of the autonomous vehicle 100 based on the logic, calculations, methods, and/or algorithms. Although only one controller 134 is shown in FIG. 1, alternative embodiments of the autonomous vehicle 100 can include any number of controllers 134 that communicate over any suitable communication medium or a combination of communication mediums and that cooperate to process the sensor signals, perform logic, calculations, methods, and/or algorithms, and generate control signals to automatically control features of the autonomous vehicle 100.

In various embodiments, one or more instructions of the controller 134 are embodied to provide ADS functions as described with reference to one or more of the embodiments herein. The controller 134 or one of its functional modules is configured to implement the functions described with reference to one or a combination of embodiments of the charging unit guidance system 110.

Figure 2:
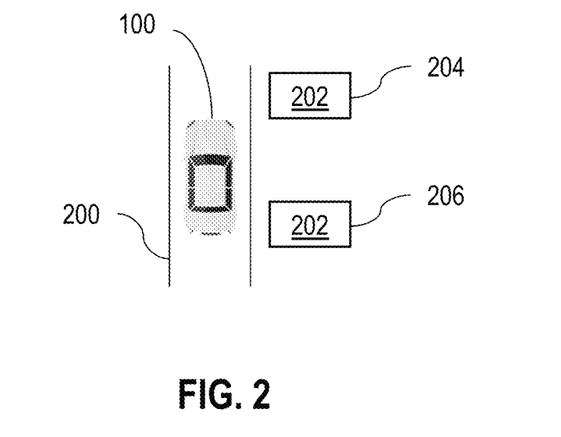
FIG. 2 is a functional block diagram representation of an autonomous vehicle including an embodiment of a charging unit guidance system parked in a parking spot at a charging station.

Referring to FIG. 2, a functional block diagram representation of an autonomous vehicle 100 including an embodiment of a charging unit guidance system 110 parked in a parking spot 200 at a charging station is shown. A user of the autonomous vehicle 100 in the parking spot 200 has access to two charging units 202. One of the charging units 202 is disposed at a first charging unit location 204 and one of the charging units 202 is disposed at a second charging unit location 206. The charging unit guidance system 110 is configured to receive vehicle location data from the vehicle sensor system 128 and generate a parking spot location based on the vehicle location data.

The charging unit guidance system 110 is configured to determine the charging unit location 204, 206 of the charging unit 202 accessed by the user to charge the autonomous vehicle 100. In an embodiment, the charging unit guidance system 110 is configured to receive user position data associated with movement of the user from the autonomous vehicle 100 to the charging unit location 204, 206 of a charging unit 202 and at the charging unit 202 from the vehicle sensor system 128. The charging unit guidance system 110 is configured to generate a sequence of observed user speeds associated with the user position data. The charging unit guidance system 110 is configured to generate a sequence of user states associated with the sequence of observed user speeds using a Viterbi algorithm in conjunction with a user state Hidden Markov Model. The charging unit guidance system 110 is configured to determine the charging unit location 204, 206 based on a correlation between the user states in the sequence of user states and the user position data.

The charging unit guidance system 110 is configured to determine a charging unit status of the charging unit 202 accessed by the user to charge the autonomous vehicle 100 based on a charging rate associated with the charging unit 202. The charging unit guidance system 110 is configured to upload the parking spot location, the charging unit location 204, 206 of the charging unit 202 accessed by the user and, the charging unit status of the charging unit 202 to an edge computing system 150. In an embodiment, the charging unit guidance system 110 is configured to upload a vehicle identification number (VIN), a vehicle model, a charging start time, a charging end time, the parking spot location, a charging station identifier, a parking spot identifier, the charging unit location 204, 206, an average charging rate, a minimum charging rate, a maximum charging rate, and the charging unit status to the edge computing system 150. The data uploaded from charging unit guidance system 110 of an autonomous vehicle to the edge computing system 150 may be referred to as charging session data.

While two charging units 202 have been illustrated as accessible to a user of an autonomous vehicle 100 parked in a parking spot 200, in alternative embodiments, a greater number of charging units 202 may be accessible to a user of an autonomous vehicle 100 parked in a parking spot 200.

Figure 3:
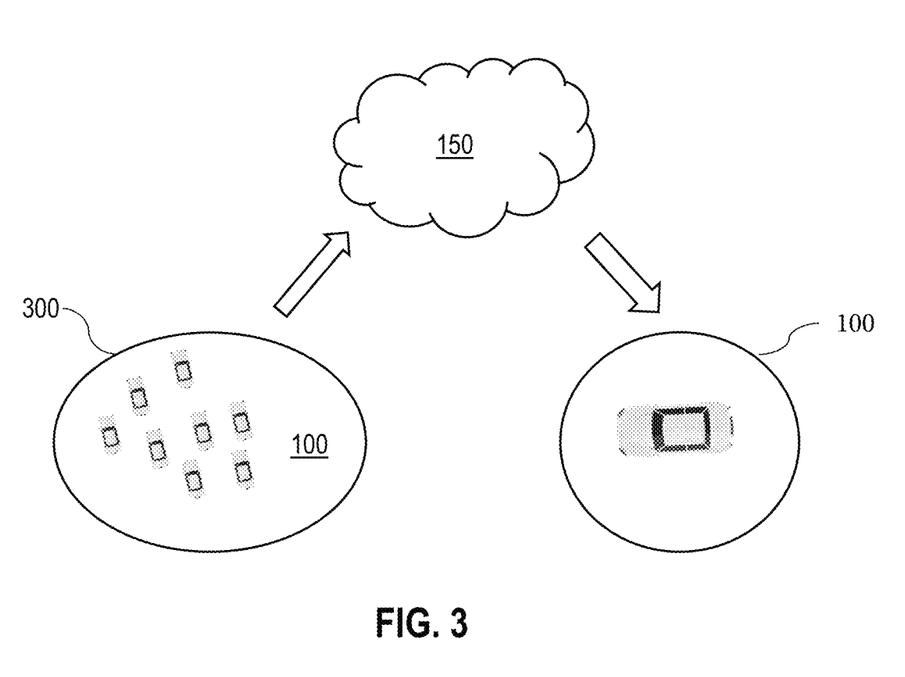
FIG. 3 is a functional block diagram representation of a plurality of autonomous vehicles including an embodiment of a charging unit guidance system communicatively coupled to an edge computing system.

Referring to FIG. 3, a functional block diagram representation of a plurality of autonomous vehicles 100 including an embodiment of a charging unit guidance system 110 communicatively coupled to an edge computing system 150 is shown. The charging unit guidance system 110 of each of the plurality of autonomous vehicles 100, represented by a group 300, is configured to upload the parking spot location, the charging unit location 204, 206 of the charging unit 202 accessed by a user of the autonomous vehicle 100, and the charging unit status of the charging unit 202 to the edge computing system 150. In an embodiment, The charging unit guidance system 110 of each of the plurality of autonomous vehicles 100, represented by a group 300, is configured to upload a vehicle identification number (VIN), a vehicle model, a charging start time, a charging end time, the parking spot location, a charging station identifier, a parking spot identifier, the charging unit location 204, 206, an average charging rate, a minimum charging rate, a maximum charging rate, and the charging unit status to the edge computing system 150. The data uploaded from charging unit guidance system 110 of an autonomous vehicle 100 to the edge computing system 150 may be referred to as charging session data.

In an embodiment, the edge computing system 150 is configured to pre-process the charging session data uploaded by each autonomous vehicle 100 in the group 300. In an embodiment, the edge computing system 150 is configured to pre-process the charging session data by classifying the charging session data in connection with the associated charging unit 202. In an embodiment, the edge computing system 150 is configured to pre-process the charging session data by classifying the charging session data in connection with different vehicle models.

In an embodiment, the edge computing system 150 is configured to store the charging session data uploaded by each autonomous vehicle 100 in the group 300 in a two-dimensional table. The edge computing system 150 is configured to sort the charging session data, for example, by time, by charging station, and/or by vehicle models.

In an embodiment, the edge computing system 150 is configured to utilize a clustering algorithm to identify the number of charging units 202 and the charging unit locations 204, 206 associated with each of the charging units 202. In an embodiment, the edge computing system 150 is configured to utilize a time decaying function to monitor a time-varying charging unit status of each of the charging units 202.

In an embodiment, the edge computing system 150 is configured to store processed results associated with each charging unit 202 in an edge computing database. Examples of the processed results include, but are not limited to, a charging unit identifier and a charging unit status. The edge computing system 150 is configured to provide guidance instructions to the charging unit guidance system 110 of the autonomous vehicle 100, 302 to a charging unit location 204, 206 of a charging unit 202 based in part on the charging unit status of the charging unit 202. In an embodiment, the autonomous vehicle 100, 302 is configured to issue a request to the edge computing system 150 for guidance instruction to an operational charging unit 202 within a pre-defined distance of the autonomous vehicle 100. The edge computing system 150 is configured to respond to the request by providing guidance instructions to the charging unit guidance system 110 of the autonomous vehicle 100, 302 to a charging unit location 204, 206 of a charging unit 202 based on charging unit location 204, 206 and the charging unit status.

In an embodiment, the edge computing system 150 is configured to receive vehicle location data generated by the vehicle sensor system 128 from the autonomous vehicle 100 and generate a parking spot location based on the received vehicle location data.

In an embodiment, the edge computing system 150 is configured to determine the charging unit location 204, 206 of the charging unit 202 accessed by the user to charge the autonomous vehicle 100. In an embodiment, the edge computing system 150 is configured to receive user position data associated with movement of the user from the autonomous vehicle 100 towards the charging unit location 204, 206 of a charging unit 202 and at the charging unit location 204, 206 generated by the vehicle sensor system 128 of the autonomous vehicle 100. The edge computing system 150 is configured to generate a sequence of observed user speeds associated with the user position data. The edge computing system 150 is configured to generate a sequence of user states associated with the sequence of observed user speeds using a Viterbi algorithm in conjunction with a user state Hidden Markov Model. The edge computing system 150 is configured to determine the charging unit location 204, 206 based on a correlation between the user states in the sequence of user states and the user position data. In an embodiment, the edge computing system 150 is configured to determine a charging unit status of the charging unit 202 accessed by the user to charge the autonomous vehicle 100 based on the charging rate associated with the charging unit 202.

The edge computing system 150 may leverage crowd sourced data associated with a charging of autonomous vehicles 100 at charging units 202 to create autonomous vehicle charging unit maps. The crowd-source data may include a charging unit status of a charging unit 202, a charging rate of the charging unit 202, and a charging unit location of the charging unit 202. The edge computing system 150 may utilize data aggregation algorithms to aggregate charging session data uploaded by individual autonomous vehicles 100. The use of data aggregation algorithms may reduce sensor error and increase system confidence. The edge computing system 150 may identify non-operational charging units 202 and monitor whether the non-operational charging units 202 are repaired. Different autonomous vehicles 100 parked in the same parking spot may report slightly different charging unit locations associated with a charging unit 202. A cluster algorithm, such as for example, centroid-based or density-based clustering algorithms may be used by the edge computing system 150 to determine the number of charging units and the charging unit locations of the charging units.

Figure 4:
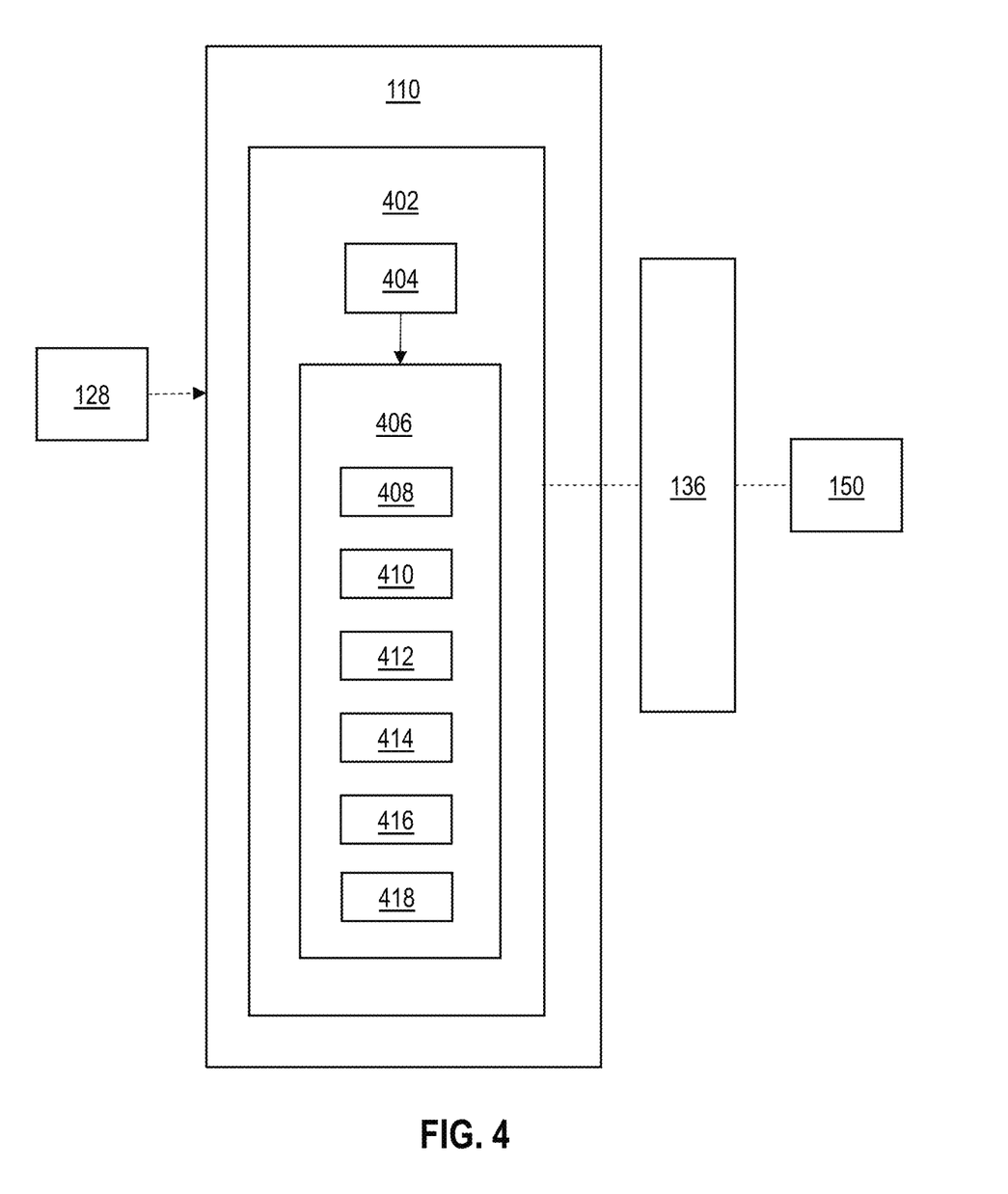
FIG. 4 is a functional block diagram representation of an embodiment of a charging unit guidance system.

Referring to FIG. 4, a functional block diagram representation of an embodiment of a charging unit guidance system 110 is shown. The charging unit guidance system 110 is configured to upload charging session data associated with charging the autonomous vehicle 100 at a charging unit 202 to the edge computing system 150. The charging unit guidance system 110 is configured to receive guidance instructions to an operational charging unit 202 within a pre-defined distance of the autonomous vehicle 100 from an edge computing system 150.

The charging unit guidance system 110 is configured to be communicatively coupled the vehicle sensor system 128 and to the vehicle communication system 136. The vehicle communication system 136 is configured to be communicatively coupled to the edge computing system 150. The charging unit guidance system 110 includes a controller 402. The controller 402 include a processor 404 and a memory 406. In an embodiment, the memory 406 includes a parking spot location module 408, a user speed sequence module 410, a user state sequence module 412, a charging unit location module 414, a charging unit status module 416, and a charging unit guidance module 418. The charging unit guidance system 110 may include additional components that facilitated the operation of the charging unit guidance system 110.

Figure 5:
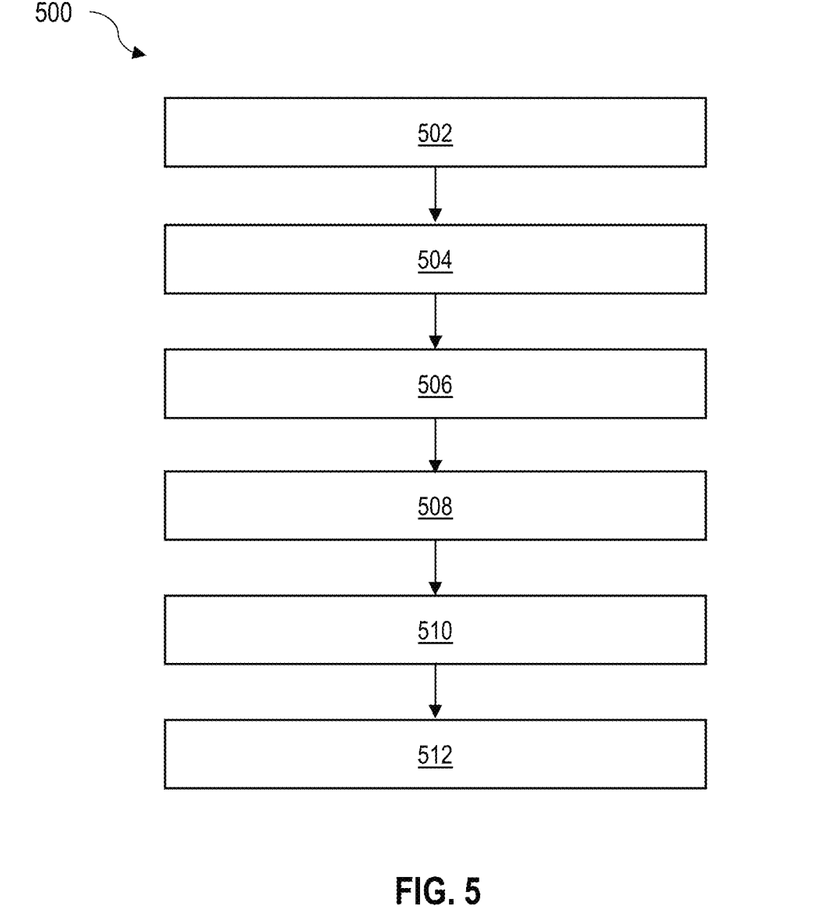
FIG. 5 is a flowchart representation of an example of a method of determining a charging unit location of a charging unit using an embodiment of a charging unit guidance system.

Referring to FIG. 5, a flowchart representation of an example of a method 500 of determining a charging unit location 204, 206 of a charging unit 202 using an embodiment of a charging unit guidance system 100 is shown. The method 500 is performed by an embodiment of a charging unit guidance system 110. In an embodiment, the method 500 may be performed by the charging unit guidance system 110 in combination with other components of an autonomous vehicle 100. The method 500 may be performed by hardware circuitry, firmware, software, and/or combinations thereof.

At 502, the parking spot location module 408 receives vehicle location data from the vehicle sensor system 128 of the autonomous vehicle 100 parked in a parking spot of a charging station. The vehicle sensor system 128 includes one or more vehicle sensing devices 140a-140n. Examples of vehicle sensing devices 140a-140n include, but are not limited to, radars, lidars, global positioning systems (GPS), optical cameras, thermal cameras, ultrasonic sensors, and/or other sensors. In an embodiment, the vehicle location data is generated by the GPS.

At 504, the parking spot location module 408 determines a parking spot location of the parking spot based on the vehicle location data. In an embodiment, the parking spot location module 408 is configured to determine the parking spot location based on the vehicle location data generated by the GPS. In an embodiment, the autonomous vehicle 100 is equipped with a high definition (HD) map. The parking spot location module 408 is configured to map the vehicle location data to the HD map to determine the parking spot location.

At 506, the user speed sequence module 410 receives user position data generated by the vehicle sensor system 128. In an embodiment, the vehicle sensor system 128 includes a surround view camera system. The surround view camera system is configured to capture and generate user position data associated with user movement as a user of the autonomous vehicle 100 walks toward and stops at a charging unit location 204, 206 of a charging unit 202 to initiate charging of the autonomous vehicle 100. In an embodiment, an optical flow algorithm is used to generate the user position data.

In an embodiment, the vehicle sensor system 128 includes a wireless positioning sensor system. The wireless positioning sensor system is configured to capture and generate user position data associated with user movement as the user of the autonomous vehicle 100 walks toward and stops at the charging unit location 204, 206 of the charging unit 202 by tracking a location of a user smartphone that the user is carrying. In an embodiment, the wireless positioning sensor system includes one or more wireless positioning devices. Examples of wireless positioning devices include, but are not limited to, Wi-Fi applications and ultra-wide band (UWB) sensors installed at the autonomous vehicle 100.

In an embodiment, the vehicle sensor system 128 includes a surround view camera system and a wireless positioning sensor system. The surround view camera system and the wireless positioning sensor system are configured to capture and generate user position data associated with user movement as the user of the autonomous vehicle 100 walks toward and stops at the charging unit location 204, 206 of the charging unit 202.

At 508, the user speed sequence module 410 generates a sequence of observed user speeds based on the user position data. The sequence of observed user speeds is associated with user movement as the user walks toward and stops at the charging unit location 204, 206 of the charging unit 202 to initiate charging of the autonomous vehicle 100.

At 510, the user state sequence module 412 generates a sequence of user states based on the sequence of observed user speeds. The user states are one of a walking state and an at-charging-unit state. A user is in a walking state when the user is walking toward the charging unit location 204, 206 of the charging unit 202 and is in an at-charging-unit state when the user stops at the charging unit location 204, 206 of the charging unit 202. The user states are hidden states. The user state sequence module 412 is configured to generate the sequence of user states associated with the sequence of observed user speeds using a Viterbi algorithm in conjunction with a user state Hidden Markov Model.

At 512, the charging unit location module 414 determines a charging unit location 204, 206 of the charging unit 202 based on the sequence of user states. The charging unit location module 414 is configured to identify the at-charging-unit states in the sequence of user states. The charging unit location module 414 is configured to generate an intermediate charging unit location associated with each of the identified at-charging-unit states based on a correlation between the at-charging-unit state and the user position data associated with that at-charging-unit state. The charging unit location module 414 is configured to determine the charging unit location 204, 206 of the charging unit 202 based on an average of the intermediate charging unit locations.

Figure 6:
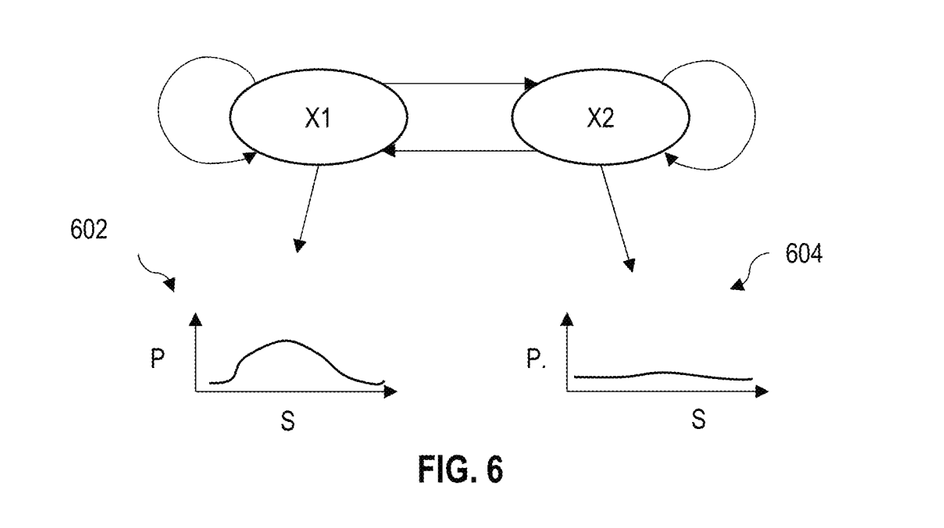
FIG. 6 is an example of a state diagram associated with a user state Hidden Markov Model utilized by an embodiment of a charging unit guidance system.

Referring to FIG. 6, an example of a state diagram associated with a user state Hidden Markov Model is shown. A Hidden Markov Model is defined based on an assumption that there is a hidden state for every observation. The user state Hidden Markov Model assumes that there is a hidden user state for every observed user speed in the sequence of observed user speeds. Each observed user speed is based on user position data detected by the vehicle sensor system 128 of the autonomous vehicle 100.

The user state Hidden Markov Model is defined based on two user states X1, X2. The two user states X1, X2 are hidden user states X1, X2. The two hidden user states X1, X2 are the walking state X1 and the at-charging-unit state X2. A user is in a walking state X1 when the user is walking toward a charging unit location 204, 206 of a charging unit 202 and in an at-charging-unit state X2 when the user is at the charging unit location 204, 206. An initial state probability is assigned to each of the hidden user states X1, X2. The initial state probability of the walking state P(X1) is one indicating that the user is initially walking from the autonomous vehicle 100 toward the charger unit location 204, 206. The initial state probability of the at-charging-unit state P(X2) is zero indicating that the user is initially not at the charging unit location 204, 206.

A state transition probability matrix A $[a_{11}, a_{12}, a_{21}, a_{22}]$ is associated with the user state Hidden Markov Model. The first entry $a_{11}$ is the probability that if a current user state is a walking state X1, the next user state will be a walking state X1. The second entry au is the probability that if the current user state is a walking state X1, the next user state will be an at-charging-unit state X2. The third entry $a_{21}$ is the probability that if the current user state is an at-charging-unit state X2, the next user state will be a walking state X1. The fourth entry $a_{22}$ is the probability that if the current user state is an at-charging-unit state X2, the next user state will be an at-charging-unit state X2. A training data set is used to train the state transition probability matrix A. In an embodiment, the training data set is a historical data set.

The probability of an observation depends on the hidden state that produced the observation. The observation is the observed user speed. The hidden states are the user states. The emission probability defines a probability of an observed user speed occurring at a hidden user state. For example, the first graph 602 represents an example of a continuous probability distribution of observed user speed associated with the walking state X1 and the second graph 604 represents an example of a continuous probability distribution of observed user speed associated with the at-charging-unit state X2. A training data set is used to train the emission probability. In an embodiment, the training data set is a historical data set.

Figure 7:
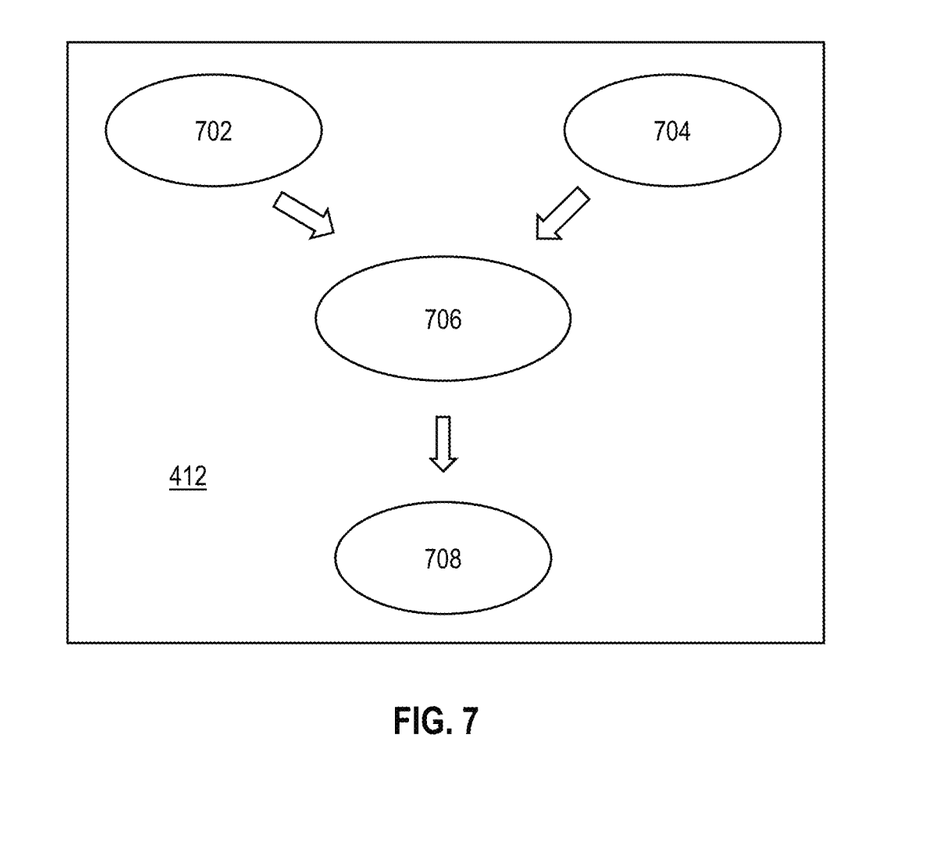
FIG. 7 is a block diagram representation of an embodiment of a user state sequence module.

Referring to FIG. 7, a block diagram representation of an embodiment of a user state sequence module 412 is shown. The user state sequence module 412 includes an observed data module 702, a user state Hidden Markov Model 704, a Viterbi algorithm module 706, and an optimal sequence of user states module 708. The user state sequence module 412 may include additional components that facilitate the operation of the user state module 214.

The observed data module 702 is configured to receive a sequence of observed user speeds generated by the user speed sequence module 410. The user state Hidden Markov Model 704 is defined based on the assumption that there is a hidden user state for every observed user speed. Each observed user speed in the sequence of observed user speeds is based on user position data detected by the vehicle sensor system 128 at the autonomous vehicle 100. The Viterbi algorithm module 706 receives the sequence of observed user speeds from the observed data module 702 and generates an optimal sequence of user states based on the sequence of observed user speeds in accordance with the user state Hidden Markov Model. The optimal sequence of user states is received by the optimal sequence of user states module 708. The user state sequence module 412 is configured to provide the optimal sequence of user states to the charging unit location module 414.

Figure 8:
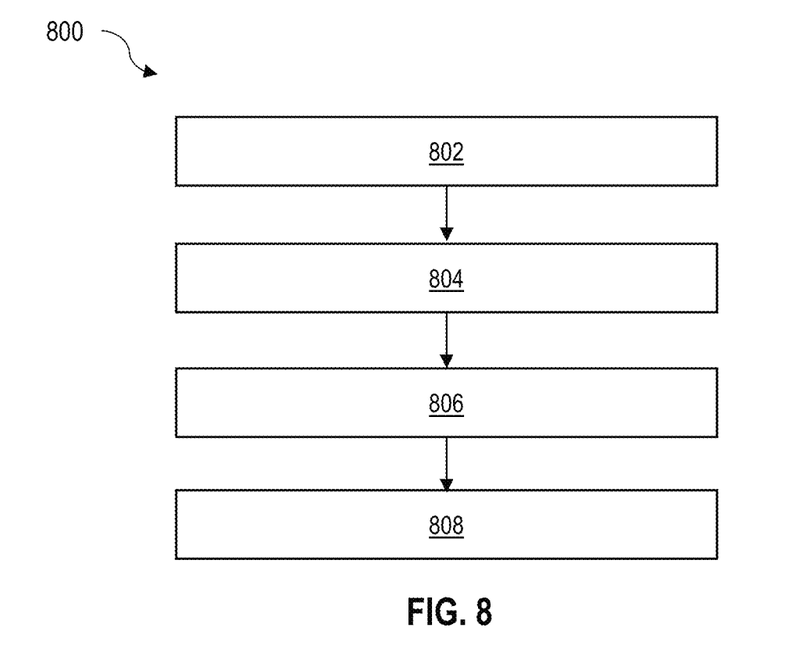
FIG. 8 is a flowchart representation an example of a method of predicting a charging unit status of a charging unit using an embodiment of a charging unit guidance system.

Referring to FIG. 8, a flowchart representation an example of a method 800 of determining a charging unit status of a charging unit 202 using an embodiment of the charging unit guidance system 110 is shown. The method 800 is performed by the charging unit guidance system 110. The method 800 may be performed by the charging unit guidance system 110 in combination with other components of the autonomous vehicle 100. The method 800 may be performed by hardware circuitry, firmware, software, and/or combinations thereof.

The charging unit guidance system 110 is configured to determine a charging unit status of charging unit 202 accessed by a user to charge an autonomous vehicle 100 based on one or more charging unit parameters. In an embodiment, the charging unit guidance system 110 is configured to determine a charging unit status of the charging unit 202 based on charging rates associated with the charging unit 202.

At 802, the charging unit status module 416 receives observed charging rates associated with the charging on the autonomous vehicle 100 at a charging unit 202. In an embodiment, the observed charging rates are received as kilowatts per hour. At 804, the charging unit status module 416 generates a sequence of observed charging rates based on the observed charging rates.

At 806, the charging unit status module 416 generates a sequence of charging unit states based on the sequence of observed charging rates. The charging unit states are one of an in-service state and an out-of-service state. A charging unit 202 is in an in-service state when the charging unit 202 is operational and in an out-of-service state when the charging unit 202 is not operational. The charging unit states are hidden states. The charging unit status module 416 is configured to generate the sequence of charging unit states associated with the sequence of observed charging rates using a Viterbi algorithm in conjunction with a charging unit state Hidden Markov Model. At 808, charging unit guidance system 110 generates a charging unit status associated with the charging unit based on the sequence of charging unit states. The charging unit status is one of an in-service status and a out-of-service status. When a charging unit 202 is in an in-service status, the charging unit 202 is an operational charging unit 202. When a charging unit 202 is in an out-of-service status, the charging unit 202 is non-operational charging unit 202.

The charging unit guidance module 418 is configured to issue a request to the edge computing system 150 for guidance instructions to an operational charging unit 202 within a pre-defined distance of the autonomous vehicle 100. The edge computing system 150 is configured to respond to the request by providing guidance instructions to a charging unit location 204, 206 of an operational charging unit 202. The ADS of the autonomous vehicle 100 implements one or more actions in accordance with guidance instructions to guide the autonomous vehicle 100 to the operational charging unit 202. The edge computing system 150 identifies the operational charging unit 202 based on the charging unit location 204, 206 and the charging unit status of the charging unit 202 stored at the edge computing system 150.

Figure 9:
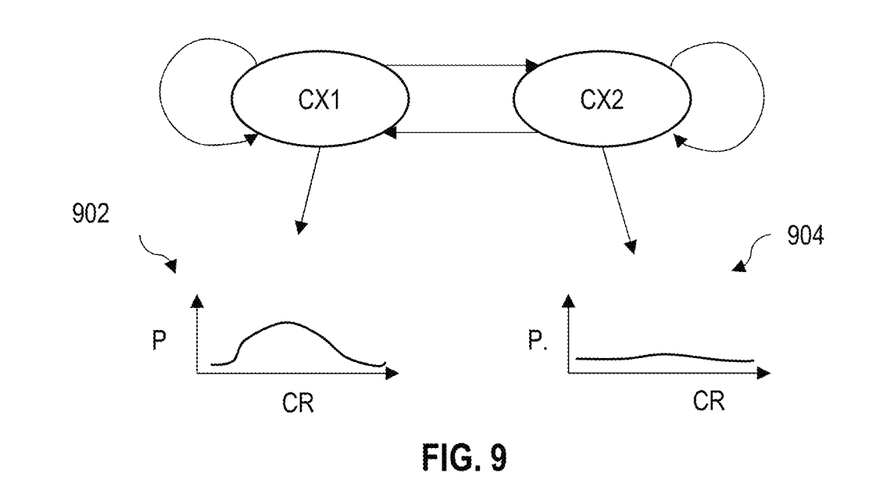
FIG. 9 is an example of a state diagram associated with a charger state Hidden Markov Model.

Referring to FIG. 9, an example of a state diagram associated with a charging unit state Hidden Markov Model is shown. A Hidden Markov Model is defined based on the assumption that there is a hidden state for every observation. The charging unit state Hidden Markov Model assumes that there is a hidden charging unit state for every observed charging rate in a sequence of observed charging rates.

The charging unit state Hidden Markov Model is defined based on two charging unit states CX1, CX2. The two charging unit states CX1, CX2 are hidden charging unit states CX1, CX2. The two hidden charging unit states CX1, CX2 are an in-service state CX1 and an out-of-service state CX2. An initial state probability is assigned to each of the hidden charging unit states CX1, CX2. The initial state probability of the in-service state P(CX1) is 0.5 indicating that there is a 50% probability that the charging unit 202 is initially in an in-service state. The initial state probability of the out-of-service state P(CX2) is 0.5 indicating that there is a 50% probability that the charging unit 202 is initially in an out-of-service state.

A state transition probability matrix B [$b_{11}$, $b_{12}$, $b_{21}$, $b_{22}$] is associated with the charging unit state Hidden Markov Model. The first entry $b_{11}$ is the probability that if a current charging unit state is an in-service state CX1, the next charging unit state will be an in-service state CX1. The second entry $b_{12}$ is the probability that if the current charging unit state is an in-service state CX1, the next charging unit state will be an out-of-service state CX2. The third entry $b_{21}$ is the probability that if the current charging unit state is an out-of-service state CX2, the next charging state will be an in-service state CX1. The fourth entry $b_{22}$ is the probability that if the current charging unit state is an out-of-service state CX2, the next charging unit state will be an out-of-service state CX2. A training data set is used to train the state transition probability matrix B. In an embodiment, the training data set is a historical data set.

The probability of an observation depends on the hidden state that produced the observation. The observation is the observed charging rate. The hidden states are the charging unit states. The emission probability defines a probability of an observed charging rate occurring at a hidden charging unit state. For example, the first graph 902 represents an example of a continuous probability distribution of observed charging rates associated with the in-service state CX1 and the second graph 904 represents an example of a continuous probability distribution of observed charging rates associated with the out-of-service state CX2. A training data set is used to train the emission probability. In an embodiment, the training data set is a historical data set.

The charging unit state Hidden Markov Model is defined based on the assumption that there is a hidden charging unit state for every observed charging rate. A Viterbi algorithm receives the sequence of observed charging rates and generates an optimal sequence of charging unit states based on the sequence of observed charging rates in accordance with the charging unit state Hidden Markov Model. A charging unit status associated with the charging unit based on the optimal sequence of charging unit states. The charging unit status is one of an in-service status and an out-of-service status. When a charging unit 202 is in an in-service status, the charging unit 202 is an operational charging unit 202. When a charging unit 202 is in an out-of-service status, the charging unit 202 is non-operational charging unit 202.

While one example of a charging unit state Hidden Markov Model based on an observed charging rates of a charging unit 202 has been described, alternative embodiments may include a charging unit state Hidden Markov Model based on other observed charging unit parameters associated with the charging unit 202. For example, an observed sequence of charging unit statuses may be used to define a charging unit state Hidden Markov Model.

Figure 10:
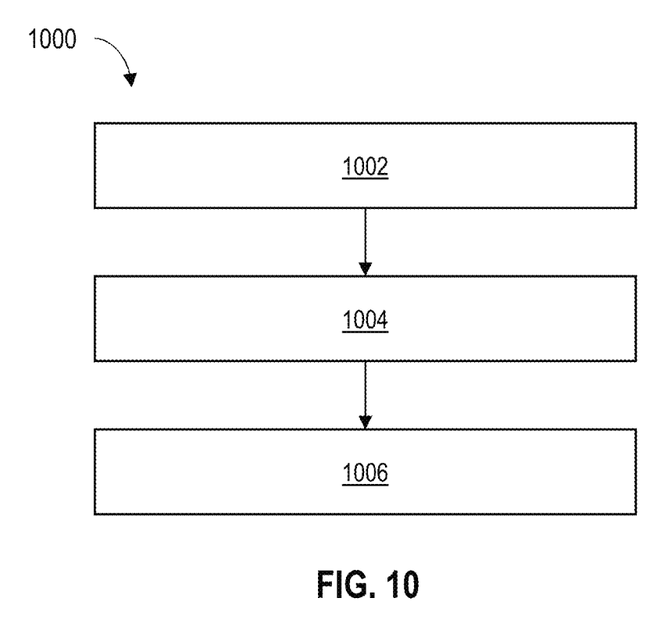
FIG. 10 is an example of a method of providing guidance instructions to an operational charging unit using an embodiment of a charging unit guidance system.

Referring to FIG. 10, an example of a method 1000 of providing guidance instructions to an operational charging unit 202 using an embodiment of a charging unit guidance system 110 is shown. The method 1000 is performed by the charging unit guidance system 110. The method 1000 may be performed by the charging unit guidance system 110 in combination with other components of the autonomous vehicle 100 and/or the edge computing system 150. The method 1000 may be performed by hardware circuitry, firmware, software, and/or combinations thereof.

At 1002, a sequence of user states associated with a user of a first autonomous vehicle 100 is received at a charging unit guidance system 110. Each user state is one of a walking state and an at-charging-unit state. The sequence of user states is based on a sequence of observed user speeds associated with detected user position data associated with movement of the user from the first autonomous vehicle 100 to a charging unit 202 and at the charging unit 202. At 1004, a charging unit location 204, 206 of the charging unit 202 is determined based on a correlation between the at-charging-unit states in the sequence of user states and the user position data at the charging unit guidance system 110. At 1006, the charging unit guidance system 110 uploads the charging unit location 204, 206 associated with the charging unit 202 from the charging unit guidance system 110 to an edge computing system 150, the edge computing system 150 being configured to provide guidance instructions to the charging unit 202 to a second autonomous vehicle 100 based at least in part on the charging unit location 204, 206.

The charging unit guidance system 110 may enable a user of an autonomous vehicle 100 to charge the autonomous vehicle 100 using an operational charging unit 202 without having to travel to multiple charging units 202 to find an operational charging unit 202.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It is to be understood that various changes can be made in the function and arrangement of elements without departing from the scope of the disclosure as set forth in the appended claims and the legal equivalents thereof

What is claimed is:

1. A charging unit guidance system of a first autonomous vehicle, the charging unit guidance system comprising:
   a processor; and
   a memory, the memory including instructions that upon execution by the processor, cause the processor to:
   receive a sequence of user states associated with a user of the first autonomous vehicle, each user state being one of a walking state and an at-charging-unit state and the sequence of user states being based on a sequence of observed user speeds associated with detected user position data associated with movement of the user from the first autonomous vehicle to a charging unit and at the charging unit;
   determine a charging unit location of the charging unit based on a correlation between the at-charging-unit states in the sequence of user states and the user position data; and
   upload the charging unit location associated with the charging unit to an edge computing system, the edge computing system being configured to provide, to a second autonomous vehicle, guidance instructions on how to navigate to the charging unit based at least in part on the charging unit location.

2. The system of claim 1, wherein the detected user position data is detected by at least one of a surround view camera system and a wireless positioning sensor system of a vehicle sensor system of the first autonomous vehicle.

3. The system of claim 1, wherein the memory includes further instructions that upon execution by the processor, cause the processor to determine a parking spot location associated with the charging unit based in part on vehicle location data received from a vehicle sensor system of the first autonomous vehicle.

4. The system of claim 1, wherein the memory includes further instructions that upon execution by the processor, cause the processor to generate the sequence of user states associated with the sequence of observed user speeds using a Viterbi algorithm in conjunction with a user state Hidden Markov Model, the user states being hidden states.

5. The system of claim 1, wherein the memory includes further instructions that upon execution by the processor, cause the processor to:
   receive a sequence of charging unit states associated with the charging unit, each of the charging unit states being one of an in-service state and an out-of-service state and the sequence of charging unit states being based on a sequence of observed charging rates associated with the charging unit; and
   determine a charging unit status of the charging unit based on the sequence of charging unit states.

6. The system of claim 5, wherein the memory includes further instructions that upon execution by the processor, cause the processor to upload the charging unit status of the charging unit to the edge computing system, the edge computing system being configured to provide, to a second autonomous vehicle, guidance instructions on how to navigate to the charging unit based at least in part on the charging unit status.

7. The system of claim 5, wherein the memory includes further instructions that upon execution by the processor, cause the processor to generate the sequence of the charging unit states associated with the sequence of the observed charging rates using a Viterbi algorithm in conjunction with a charging unit state Hidden Markov Model, the charging unit states being hidden states.

8. A computer readable medium used by a first autonomous vehicle, the computer readable medium comprising instructions stored thereon for providing guidance instructions on how to navigate to a charging unit, that upon execution by a processor, cause the processor to:
   receive a sequence of user states associated with a user of the first autonomous vehicle, each user state being one of a walking state and an at-charging-unit state and the sequence of user states being based on a sequence of observed user speeds associated with detected user position data associated with movement of the user from the first autonomous vehicle to a charging unit and at the charging unit;
   determine a charging unit location of the charging unit based on a correlation between the at-charging-unit states in the sequence of user states and the user position data; and
   upload the charging unit location associated with the charging unit to an edge computing system, the edge computing system being configured to provide, to a second autonomous vehicle, guidance instructions on how to navigate to the charging unit based at least in part on the charging unit location.

9. The computer readable medium of claim 8, further comprising instructions to cause the processor to receive the detected user position data from at least one of a surround view camera system and a wireless positioning sensor system of a vehicle sensor system of the first autonomous vehicle.

10. The computer readable medium of claim 8, further comprising instructions to cause the processor to determine a parking spot location associated with the charging unit based in part on vehicle location data received from a vehicle sensor system of the first autonomous vehicle.

11. The computer readable medium of claim 8, further comprising instructions to cause the processor to generate the sequence of user states associated with the sequence of observed user speeds using a Viterbi algorithm in conjunction with a user state Hidden Markov Model, the user states being hidden states.

12. The computer readable medium of claim 8, further comprising instructions to cause the processor to:
   receive a sequence of charging unit states associated with the charging unit, each of the charging unit states being one of an in-service state and an out-of-service state and the sequence of charging unit states being based on a sequence of observed charging rates associated with the charging unit; and
   determine a charging unit status of the charging unit based on the sequence of charging unit states.

13. The computer readable medium of claim 12, further comprising instructions to cause the processor to upload the charging unit status of the charging unit to the edge computing system, the edge computing system being configured to provide, to the second autonomous vehicle, guidance instructions on how to navigate to the charging unit based at least in part on the charging unit status.

14. The computer readable medium of claim 12, further comprising instructions to cause the processor to generate the sequence of the charging unit states associated with the sequence of the observed charging rates using a Viterbi algorithm in conjunction with a charging unit state Hidden Markov Model, the charging unit states being hidden states.

15. A method of providing guidance instructions on how to navigate to a charging unit comprising:
   receiving a sequence of user states associated with a user of a first autonomous vehicle having a charging unit guidance system, each user state being one of a walking state and an at-charging-unit state and the sequence of user states being based on a sequence of observed user speeds associated with detected user position data associated with movement of the user from the first autonomous vehicle to a charging unit and at the charging unit;
   determining a charging unit location of the charging unit based on a correlation between the at-charging-unit states in the sequence of user states and the user position data; and
   uploading the charging unit location associated with the charging unit to an edge computing system, the edge computing system being configured to provide, to a second autonomous vehicle, guidance instructions on how to navigate to the charging unit based at least in part on the charging unit location.

16. The method of claim 15, further comprising generating the sequence of user states associated with the sequence of observed user speeds using a Viterbi algorithm in conjunction with a user state Hidden Markov Model, the user states being hidden states at the charging unit guidance system.

17. The method of claim 15, further comprising:
   receiving a sequence of charging unit states associated with the charging unit at a charging unit guidance system, each of the charging unit states being one of an in-service state and an out-of-service state and the sequence of charging unit states being based on a sequence of observed charging rates associated with the charging unit; and
   determining a charging unit status of the charging unit based on the sequence of charging unit states at the charging unit guidance system.

18. The method of claim 17, further comprising uploading the charging unit status of the charging unit to the edge computing system, the edge computing system being configured to provide, to the second autonomous vehicle, guidance instructions on how to navigate to the charging unit based at least in part on the charging unit status.

* * * * *